United States Patent
Allias et al.

(10) Patent No.: US 12,486,038 B2
(45) Date of Patent: Dec. 2, 2025

(54) PROPELLER-TYPE PROPULSION SYSTEM FOR AN AIRCRAFT

(71) Applicants: Airbus Operations SAS, Toulouse (FR); Airbus SAS, Blagnac (FR); Airbus Operations S.L., Getafe (ES)

(72) Inventors: Jean-François Allias, Toulouse (FR); Franck Alvarez, Toulouse (FR); Pascal Pome, Toulouse (FR); Nicolas Jolivet, Toulouse (FR); Rémi Amargier, Toulouse (FR); Salvatore Demelas, Getafe (ES); Norberto Simionato Neto, Taufkirchen (DE); Benedikt Bammer, Taufkirchen (DE); Damien Mariotto, Marignane (FR)

(73) Assignees: Airbus Operations SAS, Toulouse (FR); Airbus SAS, Blagnac (FR); Airbus Operations S.L., Getafe (ES)

( * ) Notice: Subject to any disclaimer, the term of this patent is extended or adjusted under 35 U.S.C. 154(b) by 810 days.

(21) Appl. No.: 17/865,612

(22) Filed: Jul. 15, 2022

(65) Prior Publication Data

US 2023/0021085 A1    Jan. 19, 2023

(30) Foreign Application Priority Data

Jul. 19, 2021    (FR) ...................... 2107764

(51) Int. Cl.
*B64D 35/08* (2025.01)
*B64D 27/31* (2024.01)
(Continued)

(52) U.S. Cl.
CPC ............ *B64D 35/08* (2013.01); *B64D 27/31* (2024.01); *B64D 27/34* (2024.01); *B64D 35/021* (2024.01)

(58) Field of Classification Search
CPC ..... B64D 35/08; B64D 35/021; B64D 35/023; B64D 35/025; B64D 35/024; B64D 35/022; B64D 27/34; B64D 27/31
See application file for complete search history.

(56) References Cited

U.S. PATENT DOCUMENTS

| | | | |
|---|---|---|---|
| 8,821,200 B2* | 9/2014 | Krackhardt | B63H 25/42 440/75 |
| 2003/0071167 A1* | 4/2003 | Thomassey | B64C 29/0033 244/6 |

(Continued)

FOREIGN PATENT DOCUMENTS

| | | | |
|---|---|---|---|
| DE | 102004004480 A1 | 6/2006 | |
| EP | 4086178 A1 * | 11/2022 | B64D 37/34 |

(Continued)

OTHER PUBLICATIONS

French Search Report; priority document.

*Primary Examiner* — Joshua J Michener
*Assistant Examiner* — Aaron M Rodziwicz
(74) *Attorney, Agent, or Firm* — Greer, Burns & Crain, Ltd.

(57) ABSTRACT

A propeller-type propulsion system for aircraft, comprises a propeller, a plurality of electric motors comprising nested coaxial respective driveshafts, and a gearbox having an output shaft onto which the propeller is mechanically coupled, and an input shaft to which the coaxial driveshafts of the electric motors are mechanically coupled. As a result, the diameter of the propulsion system, in a plane perpendicular to the axis of rotation of the propeller, is reduced. This improves the aerodynamics and the fuel consumption of the aircraft.

9 Claims, 2 Drawing Sheets

(51) Int. Cl.
*B64D 27/34* (2024.01)
*B64D 35/021* (2024.01)

(56) References Cited

U.S. PATENT DOCUMENTS

| | | | |
|---|---|---|---|
| 2017/0190435 A1 | 7/2017 | Kobayashi et al. | |
| 2018/0251226 A1* | 9/2018 | Fenny | B64D 27/33 |
| 2019/0009894 A1* | 1/2019 | Cai | B64U 10/13 |
| 2019/0118943 A1* | 4/2019 | Machin | B64C 29/02 |
| 2019/0193835 A1 | 6/2019 | Sandberg et al. | |
| 2020/0361622 A1 | 11/2020 | Groninga et al. | |
| 2021/0039802 A1* | 2/2021 | Chesneau | B64C 29/0016 |
| 2021/0078719 A1 | 3/2021 | Thomas et al. | |
| 2023/0017954 A1* | 1/2023 | Allias | B64D 35/021 |

FOREIGN PATENT DOCUMENTS

| | | |
|---|---|---|
| FR | 3097202 A1 | 12/2020 |
| JP | S621690 A | 1/1987 |
| WO | 2017114245 A1 | 7/2017 |

* cited by examiner

PROPELLER-TYPE PROPULSION SYSTEM FOR AN AIRCRAFT

CROSS-REFERENCES TO RELATED APPLICATIONS

This application claims the benefit of the French patent application No. 2107764 filed on Jul. 19, 2021, the entire disclosures of which are incorporated herein by way of reference.

FIELD OF THE INVENTION

The present invention relates to a propeller-type propulsion system for an aircraft, which comprises a plurality of electric motors that together turn the propeller.

BACKGROUND OF THE INVENTION

Electric motors can be used to drive in rotation a propeller of a propulsion system, and thus move an aircraft both on the ground and in flight.

Since commercial aircraft are relatively heavy vehicles, significant propulsion energy is needed to move them. Thus, aircraft typically have multiple propulsion systems, that is to say, multiple propeller-type engines. In spite of this, each propulsion system must typically have multiple electric motors which act together to turn the propeller.

A gearbox is used for that purpose. Since each electric motor has an output shaft (driveshaft), the gearbox provides mechanical coupling between the output shafts of these electric motors and an output shaft of the gearbox, which is secured to the propeller. Thus, the gearbox has the same number of input shafts as there are electric motors arranged in parallel. One drawback of this arrangement is that, since the motors are mounted in parallel, the propulsion system is bulky both in terms of height and in terms of width. In other words, the diameter of the propulsion system, in a plane perpendicular to the axis of rotation of the propeller, is large. This impairs the aerodynamics of the aircraft and increases its fuel (e.g., hydrogen) consumption.

It is therefore desirable to provide a solution by which it is possible to improve the aerodynamics and fuel consumption of the aircraft.

SUMMARY OF THE INVENTION

The present invention therefore proposes a propeller-type propulsion system for aircraft, comprising: a propeller; a plurality of electric motors comprising nested coaxial respective driveshafts; and a gearbox having an output shaft onto which the propeller is mechanically coupled; and an input shaft to which the coaxial driveshafts of the electric motors are mechanically coupled.

According to one particular embodiment, the smaller the diameter of a coaxial driveshaft, the further into the gearbox that coaxial driveshaft passes.

According to one particular embodiment, the coaxial driveshafts are mechanically coupled to a cloche secured to the input shaft in such a way that the coaxial driveshafts and the input shaft of the gearbox share a single axis of rotation.

According to one particular embodiment, the coaxial driveshafts are mechanically coupled to an internal wall of the cloche by means of respective gearwheels associated with a freewheel arrangement.

According to one particular embodiment, the coaxial driveshafts have coupling ends with splines or ribs by means of which the gearwheels can be securely mounted on the coaxial driveshafts via respective splined rings.

According to one particular embodiment, the electric motors are arranged from the closest to the gearbox to the furthest from the gearbox in order of decreasing diameter of their coaxial driveshafts.

According to one particular embodiment, each coaxial driveshaft comprises a portion for coupling to one motor which is provided with splines or ribs in order to mechanically couple the coaxial driveshaft in question to a rotor of the electric motor by means of a splined ring.

According to one particular embodiment, the portions of the coaxial driveshafts permitting coupling with the rotors of the electric motors are of the same diameter.

According to one particular embodiment, the axis of rotation of the coaxial driveshafts is off-center with respect to the axis of rotation of the output shaft, the propeller-type propulsion system further comprising a housing for controlling the orientation of the propeller blades, this housing being placed in continuation of the output shaft, on the opposite side of the gearbox from the propeller.

The present invention also proposes an aircraft comprising at least one propeller-type propulsion system as mentioned hereinabove in any one of its embodiments.

BRIEF DESCRIPTION OF THE DRAWINGS

The features of the invention mentioned above, along with others, will become more clearly apparent on reading the following description of at least one exemplary embodiment, the description being given with reference to the appended drawings, in which.

DETAILED DESCRIPTION OF THE PREFERRED EMBODIMENTS

Figure 1:
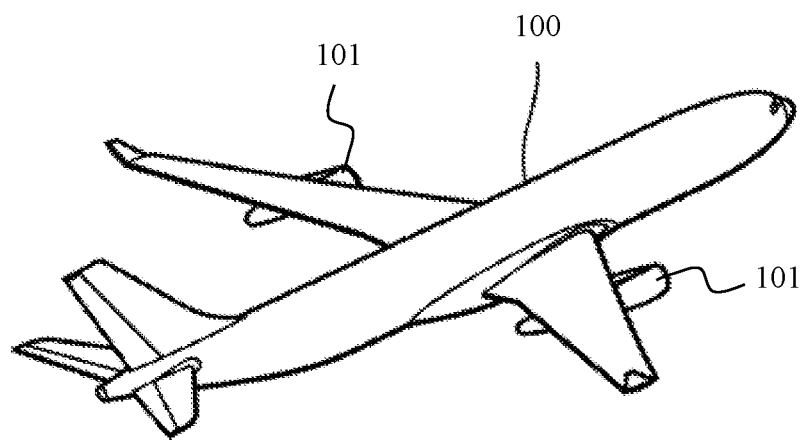
FIG. 1 shows, schematically and in perspective, an aircraft equipped with at least one propeller-type propulsion system.

FIG. 1 shows, schematically and in perspective, an aircraft 100 equipped with at least one propeller-type propulsion system 101. By way of example, the aircraft 100 of FIG. 1 comprises two propeller-type propulsion systems 101 respectively mounted on each of the wings of the aircraft 100. The aircraft 100 may comprise a different number of propeller-type propulsion systems 101.

When used here, the term "length" refers to a horizontal dimension when the aircraft 100 is on the ground, and the term "height" refers to a vertical dimension when the aircraft 100 is on the ground.

Figure 2:
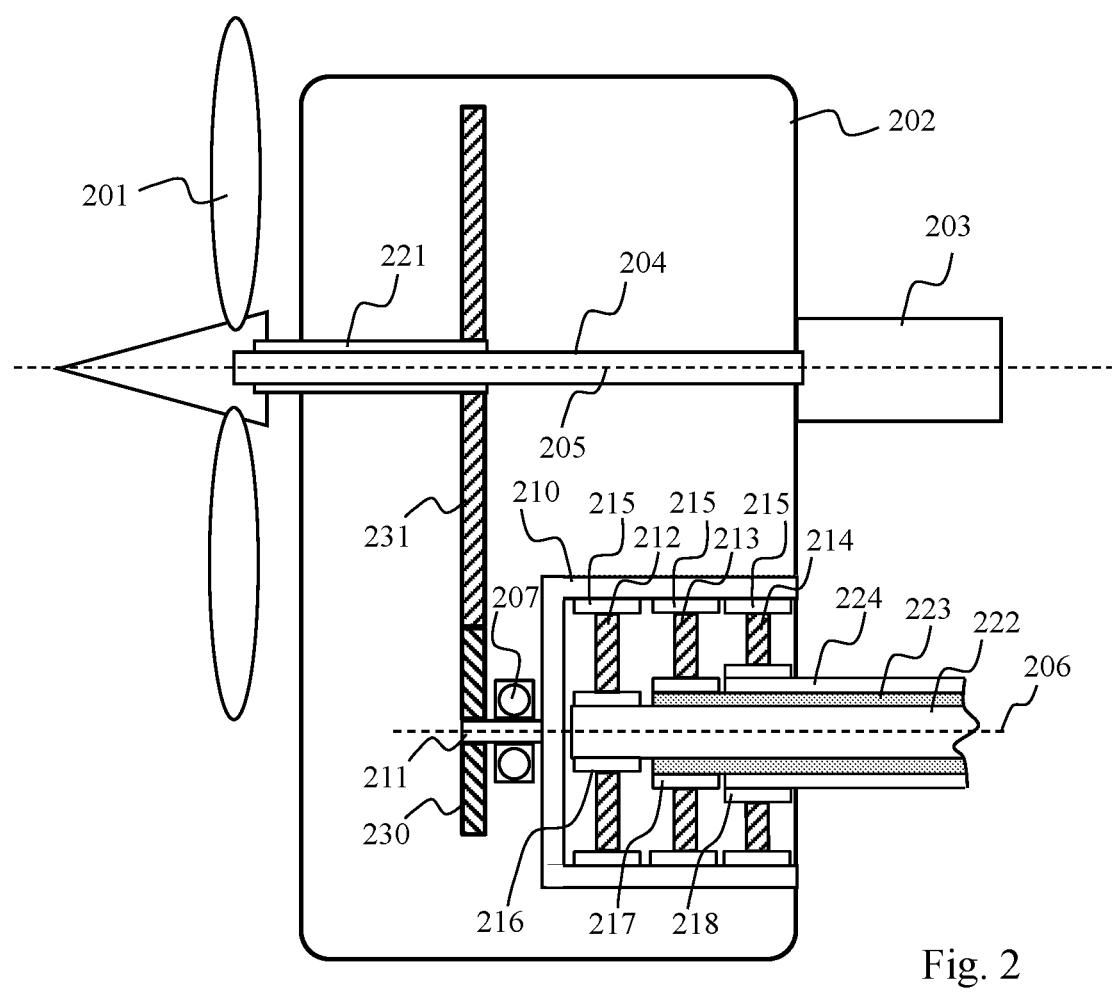
FIG. 2 shows, schematically and in simplified section, an arrangement of a first part of such a propeller-type propulsion system.

FIG. 2 shows, schematically and in simplified section, an arrangement of a first part of such a propeller-type propulsion system 101.

The propeller-type propulsion system 101 comprises a propeller 201 and a gearbox 202. The propeller may be a turboprop propeller, as depicted schematically in FIG. 2. However, other propeller configurations may be contemplated without departing from the scope of the invention. Thus, the propeller may correspond to a faired propeller (or "ducted fan"). The gearbox 202 comprises an output shaft 221 to which the propeller 201 is mechanically coupled. As shown in FIG. 2, the propeller 201 is typically mounted at the end of the output shaft 221 so that its axis of rotation is the axis of revolution 205 of the output shaft 221.

The propeller-type propulsion system 101 comprises a plurality of electric motors 300 (see FIG. 3) whose purpose is to turn the propeller 201 via the gearbox 202. For example, each electric motor 300 is powered by one or more fuel cells such as hydrogen cells.

Each electric motor 300 comprises a driveshaft and all of the driveshafts of the electric motors 300 are coaxial. The propeller-type propulsion system 101 comprises, by way of illustration, three electric motors 300 and three coaxial driveshafts 222, 223, 224 are therefore depicted schematically in FIG. 2.

The coaxial driveshafts 222, 223, 224 enter the gearbox 202 on the opposite side from the side from which the output shaft 221 emerges. The gearbox 202 comprises a set of gearwheels 230, 231 that are arranged so as to provide a reduction in rotational speed.

The coaxial driveshafts 222, 223, 224 are mechanically coupled to a single input shaft 211 of the gearbox 202. Typically, the input shaft 211 is equipped with ball bearings 207 in order that the input shaft 211 can rotate freely inside the gearbox 202.

The coaxial driveshafts 222, 223, 224 have different diameters and are accommodated inside one another in a nested arrangement. Thus, the smallest-diameter driveshaft 222 is accommodated, free to rotate, in a tubular body of the driveshaft 223 of immediately larger diameter, and so on.

In one particular embodiment, as shown in FIG. 2, the smaller the diameter of a coaxial driveshaft, the further into the gearbox 202 that coaxial driveshaft passes. Thus, the coaxial driveshaft 222 passes further into the gearbox 202 than the coaxial driveshaft 223, which itself passes further into the gearbox 202 than the coaxial driveshaft 224. That makes it possible to easily have a coupling end for each of the coaxial driveshafts 222, 223, 224, in order to bring about conjoint coupling of the coaxial driveshafts 222, 223, 224 to the input shaft 211 of the gearbox 202.

In one particular embodiment, the coaxial driveshafts 222, 223, 224 are mechanically coupled to a cloche 210 secured to the input shaft 211 in such a way that the coaxial driveshafts 222, 223, 224 and the input shaft 211 of the gearbox 202 share a single axis of rotation 206. Preferably, the coaxial driveshafts 222, 223, 224 are mechanically coupled to the internal wall of the cloche 210 by means of respective gearwheels 212, 213, 214 associated with a freewheel arrangement 215. The coupling ends of the coaxial driveshafts 222, 223, 224 may have splines or ribs by means of which the respective gearwheels 212, 213, 214 can be securely mounted on the coaxial driveshafts 222, 223, 224 via respective splined rings 216, 217, 218.

The axis of rotation 206 of the coaxial driveshafts 222, 223, 224 may coincide with the axis of rotation 205 of the output shaft 221 of the gearbox 202. However, the axis of rotation 206 of the coaxial driveshafts 222, 223, 224 is preferably parallel to the axis of rotation 205 of the output shaft 221, and off-center with respect to the axis of rotation 205 of the output shaft 221. This arrangement is particularly advantageous when the propeller-type propulsion system 101 comprises a housing 203 including a mechanism for controlling the orientation ("pitch control") of the blades of the propeller 201. Thus, the housing 203 is preferably placed in continuation of the output shaft 221, on the opposite side of the gearbox 202 from the propeller 201, by virtue of the axes 205 and 206 being off-center with respect to one another. This makes it possible to easily establish a mechanical connection 204 between the housing 203 and the propeller 201 within a tubular body of the output shaft 221. If that is not the case, the housing 203 is positioned in such a way as to minimize the offset between the housing 203 and the axis of rotation 205 of the propeller 201.

Figure 3:
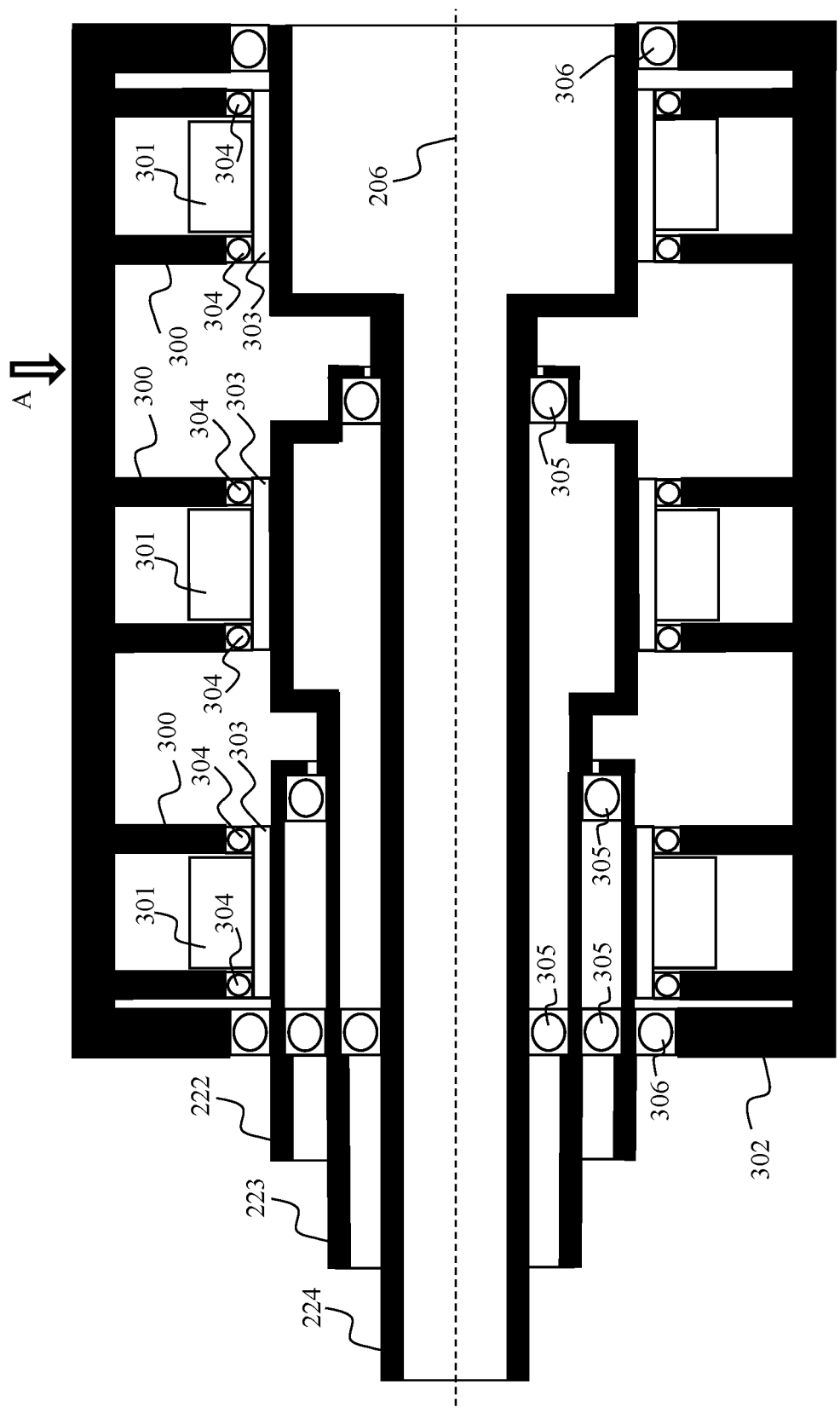
FIG. 3 shows, schematically and in simplified section, an arrangement of a second part of such a propeller-type propulsion system.

FIG. 3 shows, schematically and in simplified section, an arrangement of a second part of the propeller-type propulsion system 101, depicting an arrangement of the electric motors 300 and a nested arrangement of the coaxial driveshafts 222, 223, 224.

The electric motors 300 are arranged in a line. The electric motors 300 are arranged from the closest to the gearbox 202 to the furthest from the gearbox 202 in order of decreasing diameter of their respective coaxial driveshafts 222, 223, 224.

Each coaxial driveshaft 222, 223, 224 comprises a portion for coupling to one of the motors 300. In one particular embodiment, this coupling portion is provided with splines or ribs in order to mechanically couple the coaxial driveshaft in question to a rotor 301 of the electric motor 300 by means of a splined ring 303. Ball bearings 304 then make it possible for the coaxial driveshafts and their respective rotors 301 to rotate with respect to a chassis or casing 302 which houses the electric motors 300 and which is fixed with respect to the gearbox 202.

Preferably, the portions of the coaxial driveshafts 222, 223, 224 permitting coupling with the rotors 301 of the electric motors 300 are of the same diameter. Thus, coupling to the rotor 301 is not dependent on the position of the coaxial driveshaft 222, 223, 224 in question in the nested arrangement. This makes it possible to use strictly identical electric motors 300, which simplifies design and maintenance.

In order to ensure that the coaxial driveshafts 222, 223, 224 are free to rotate relative to one another, ball bearings 305 are present between two successive coaxial driveshafts. Since these ball bearings do not experience significant loads during normal operation, one variant involves replacing them with lubricated plain bushings.

Other ball bearings 306 serve to ensure that the assembly comprising the coaxial driveshafts 222, 223, 224 is free to rotate relative to the chassis or casing 302.

A loading path can be ensured with a first anchor point on the gearbox 202 and a second anchor point on a part of the chassis or casing 302 that is remote from the gearbox 202, for example a part of the chassis or casing 302 that is located between the two electric motors 300 that are furthest from the gearbox 202, as illustrated by arrow A in FIG. 3. This limits cantilevering.

The propeller-type propulsion system 101 is preferably self-contained, so as to simplify installation and maintenance thereof, as described in patent document FR3097202A1 or patent document US 2021/0078719 A1, the disclosures of both of which are included herein by reference.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propeller-type propulsion system for aircraft, having:
a propeller;
a plurality of electric motors comprising nested coaxial respective drive shafts; and
a gearbox having an output shaft onto which the propeller is mechanically coupled, and an input shaft to which the coaxial driveshafts of the electric motors are mechanically coupled,
wherein an axis of rotation of the coaxial driveshafts is off-center with respect to an axis of rotation of the output shaft, and further comprises a housing including a mechanism for controlling an orientation of blades of the propeller, this housing being placed in continuation of the output shaft, on an opposite side of the gearbox from the propeller.

2. The propeller-type propulsion system according to claim 1, wherein a smaller a diameter of a coaxial driveshaft, a further into the gearbox that coaxial drive shaft passes.

3. The propeller-type propulsion system according to claim 2, wherein the coaxial driveshafts are mechanically coupled to a cloche secured to the input shaft such that the coaxial driveshafts and the input shaft of the gearbox share a single axis of rotation.

4. The propeller-type propulsion system according to claim 3, wherein the coaxial driveshafts are mechanically coupled to an internal wall of the cloche by means of respective gearwheels associated with a freewheel arrangement.

5. The propeller-type propulsion system according to claim 4, wherein the coaxial driveshafts have coupling ends with splines or ribs by means of which the gearwheels are securely mounted on the coaxial driveshafts via respective splined rings.

6. The propeller-type propulsion system according to claim 1, wherein the electric motors are arranged from a closest to the gearbox to a furthest from the gearbox in order of decreasing diameter of their coaxial driveshafts.

7. The propeller-type propulsion system according to claim 1, wherein each coaxial driveshaft comprises a portion for coupling to one motor which is provided with splines or ribs to mechanically couple the coaxial driveshaft in question to a rotor of said electric motor by means of a splined ring.

8. The propeller-type propulsion system according to claim 7, wherein the portions of said coaxial driveshafts permitting coupling with the rotors of the electric motors are of the same diameter.

9. An aircraft comprising at least one propeller-type propulsion system as claimed in claim 1.

* * * * *